US011138433B2

(12) United States Patent
Lee (10) Patent No.: US 11,138,433 B2
(45) Date of Patent: Oct. 5, 2021

(54) CABIN EXPERIENCE NETWORK WITH A SENSOR PROCESSING UNIT

(71) Applicant: The Boeing Company, Chicago, IL (US)

(72) Inventor: Donald B. Lee, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/435,356

(22) Filed: Jun. 7, 2019

(65) Prior Publication Data

US 2020/0387705 A1 Dec. 10, 2020

(51) Int. Cl.
| | |
|---|---|
| *G06K 9/00* | (2006.01) |
| *H04W 4/38* | (2018.01) |
| *H04W 4/42* | (2018.01) |
| *G06K 9/62* | (2006.01) |
| *G06N 3/08* | (2006.01) |
| *H04L 29/08* | (2006.01) |

(52) U.S. Cl.
CPC ....... *G06K 9/00664* (2013.01); *G06K 9/6256* (2013.01); *G06K 9/6289* (2013.01); *G06N 3/08* (2013.01); *H04L 67/12* (2013.01); *H04W 4/38* (2018.02); *H04W 4/42* (2018.02)

(58) Field of Classification Search
USPC ........................................................ 348/144
See application file for complete search history.

(56) References Cited

U.S. PATENT DOCUMENTS

| | | | |
|---|---|---|---|
| 9,197,906 | B1 | 11/2015 | Kathol et al. |
| 9,733,346 | B1 * | 8/2017 | Jang ........................ G01S 11/14 |
| 2004/0008253 | A1 | 1/2004 | Monroe |
| 2012/0007981 | A1 | 1/2012 | Guerrera |
| 2015/0120261 | A1 * | 4/2015 | Giannacopoulos ..... G06F 30/23 |
| | | | 703/2 |
| 2015/0339241 | A1 * | 11/2015 | Warner ................. G06F 13/385 |
| | | | 710/74 |
| 2017/0106875 | A1 * | 4/2017 | Yamasaki ............. B60R 16/037 |
| 2017/0357866 | A1 | 12/2017 | Welland et al. |
| 2018/0020081 | A1 * | 1/2018 | Teague .................. B64C 39/024 |
| 2018/0047288 | A1 | 2/2018 | Cordell et al. |
| 2018/0049005 | A1 * | 2/2018 | Still ...................... H04W 24/08 |
| 2018/0068004 | A1 | 3/2018 | Lavasani |
| 2018/0288182 | A1 | 10/2018 | Tong et al. |
| 2018/0292983 | A1 | 10/2018 | Nor et al. |

(Continued)

OTHER PUBLICATIONS

Extended European Search Report dated Oct. 22, 2020 in corresponding European Application No. 20178471.7, 11 pages.

*Primary Examiner* — Behrooz M Senfi
(74) *Attorney, Agent, or Firm* — MH2 Technology Law Group LLP (57) ABSTRACT

A computer-implemented method of processing raw sensor data in an Aviation Internet of Things (AIoT) system is provided. The computer-implemented method comprises obtaining, by a network interface of a sensor processing unit (SPU), raw sensor data from one or more systems of a vehicle; providing, by the network interface, the raw sensor data to one or more processing units of the SPU; performing, by the one or more processing units, one or more processing tasks on the raw sensor data to produce processed data; and providing, by the network interface, the processed data to the one or more systems.

20 Claims, 6 Drawing Sheets

(56) References Cited

U.S. PATENT DOCUMENTS

| | | | |
|---|---|---|---|
| 2018/0365533 A1* | 12/2018 | Sathyanarayana | G05D 1/0221 |
| 2019/0102689 A1 | 4/2019 | Lassoued et al. | |
| 2019/0303759 A1* | 10/2019 | Farabet | G06K 9/4628 |
| 2019/0340933 A1* | 11/2019 | Villa | G06Q 10/06315 |
| 2020/0020328 A1* | 1/2020 | Gordon | H04L 63/0245 |
| 2020/0103902 A1* | 4/2020 | Dominic | G01C 21/3484 |
| 2020/0118418 A1* | 4/2020 | Benjamin | G10L 15/22 |

\* cited by examiner

CABIN EXPERIENCE NETWORK WITH A SENSOR PROCESSING UNIT

FIELD

The present teachings relate to the field of parallel processing, computational load leveling, and distributed computing.

BACKGROUND

The new Cabin Experience Network (CEN) system provides a general purpose network to add functionality and features to commercial and business aircraft. The first application was a 31-camera video surveillance system on the 777X. The network and server are capable of hosting Internet Protocol Ethernet interfaces such as cameras and sensors. These discrete units are combined into final products via specially written software application programs running on the CEN server. The CEN system is capable of hosting many different sensors besides cameras. These sensors are connected to the network by network switches, wireless access points, consolidators, and bridges that convert the sensor interface into an Internet Protocol (IP) interface that the CEN system can communicate with.

Once aircraft move into the sensor design space, computational capabilities of aircraft quickly run out of processing power to accomplish tasks like facial recognition, motion detection, movement tracking, and sensor fusion (the mixing of two or more sensors into one coherent image), and processing multiples of sensor types. This requires a great deal more processing power that is not normally found in an on-board network server. Moreover, current sensor systems are self-contained and dedicated to specific functions. These federated systems are not easily expanded due to limited interface ports, wiring installation, specialized software, and certification concerns and cost. As such, there is no clean way to provide additional integrated sensors and sensor fusion capability in the cabin areas without incurring high cost.

One solution to this problem is to process the data off-board and send the results back to the airplane. However, this is not practical due to bandwidth limits for the current airplane off-board communication systems.

Accordingly, what is needed is an on-board network server or other computing resource that can address the above-noted deficiencies of the current camera/sensor system approaches.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In accordance with examples in the present disclosure, this disclosure outlines a computer-implemented method for adding enhanced processing capabilities enabling new or existing networks to add applications and system features that require more processing capability than is available in the originally designed into the onboard network server. The present Sensor Processing Unit (SPU) disclosure uses a multi-computer box with the same form/fit and interface as the existing Network Attached Storage (NAS) device. This allows for easy addition of a Sensor Processing Unit (SPU) with up to six full computers (each containing unique CPU, RAM, ROM, I/O, and Storage) and a multiport network interface (network switch) that allows the SPSU to interface to the target network in the same tray space and interface wiring as one NAS unit. Airplane/Vehicle wiring does not change, only the function of the box on the network. The SPU offloads the network server by doing the computational heavy lifting required for sensor fusion, facial recognition and multi-sensor/multi-zone/environment/motion/tracking applications, failure prediction, sensor data analysis, and data logging/post-processing.

In accordance with the present disclosure, a computer-implemented method of processing raw sensor data in an Aviation Internet of Things (AIoT) system is provided. The computer-implemented method comprises obtaining, by a network interface of a sensor processing unit (SPU), raw sensor data from one or more systems of a vehicle; providing, by the network interface, the raw sensor data to one or more processing units of the SPU; performing, by the one or more processing units, one or more processing tasks on the raw sensor data to produce processed data; and providing, by the network interface, the processed data to the one or more systems. In some examples, the one or more systems comprise one or more displays, one or more storage devices, one or more projector devices, or one or more off-board systems. In some examples, the SPU comprises six parallel multi-core computers that are dedicated to process the raw sensor data. In some examples, the SPU is in data communication with a switch of a Cabin Experience Network (CEN) system.

In accordance with the present disclosure, a computer system is provided that comprises at least one hardware processor; a non-transitory computer readable medium storing instructions, that when executed by the at least one hardware processor, performs a method of processing raw sensor data in an Aviation Internet of Things (AIoT) system, the method comprising: obtaining, by a network interface of a sensor processing unit (SPU), raw sensor data from one or more systems of a vehicle; providing, by the network interface, the raw sensor data to one or more processing units of the SPU; performing, by the one or more processing units, one or more processing tasks on the raw sensor data to produce processed data; and providing, by the network interface, the processed data to the one or more systems. In some examples, the one or more systems comprise one or more displays, one or more storage devices, one or more projector devices, or one or more off-board systems. In one examples, the SPU comprises six parallel multi-core computers that are dedicated to processor the raw sensor data. In some examples, the SPU is in data communication with a switch of a Cabin Experience Network (CEN) system.

In accordance with the present disclosure, a Cabin Experience Network (CEN) system is provided that comprises a CEN server; a first CEN switch in communication with the CEN server, wherein the first CEN switch is in communication with at least one of: one or more first projector devices and one or more first cameras; and a sensor processing unit (SPU) in communication with the first CEN switch, wherein the SPU obtains raw sensor data from the first CEN switch and processes the raw sensor data that is provided to the first CEN switch as processed sensor data. In some examples, the CEN system further comprises a second CEN switch in communication with the CEN server, wherein the second CEN switch is in communication with at least one of: one or more second projector devices and one or more second cameras, wherein the SPU in communication with the second CEN switch, wherein the SPU obtains raw sensor data from the second CEN switch and processes the raw sensor data that is provided to the second CEN switch as processed sensor data. In some examples, the SPU comprises six parallel multi-core computers that are dedicated to process the raw sensor data.

In some examples, the SPU can comprise six parallel multi-core computers that are dedicated to processor the raw sensor data. In some examples, the SPU is in data communication with a switch of a Cabin Experience Network (CEN) system. In some examples, one of the six parallel multi-core computer is trained using a machine-learning algorithm.

BRIEF DESCRIPTION OF THE FIGURES

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts.

Examples of the present disclosure address the above-noted problems of conventional CEN system that are network limited in computational bandwidth, and in particular CEN system that host network extensive applications such as a video surveillance camera system. Accordingly, a Sensor Processing Unit (SPU) is provided with a CEN system according to the present disclosure that is attached to a target network in a similar manner to a Network Attached Storage (NAS). The SPU functions as a network attached box containing a plurality of, for example, six, parallel multi-core computers (each containing unique CPU, RAM, ROM, I/O, and Storage) that are dedicated to applications requiring intense computational tasks. The interface of the SPU would function just like any other component of the CEN system. The sensor application (or applications) would reside and run on the CEN network server. These software application programs would direct the raw sensor data to the attached SPU where the data is analyzed, parsed, fused, formatted, and presented back to the CEN server sensor application where it is routed to displays, storage, or off-board system. Since the SPU does the computational heavy lifting, the CEN network does not get overburdened by processing sensor data, allowing for even more applications to be run on the CEN server. Breaking out the sensor data processing from the CEN server will provide a computing capability enhance option that enables new sensor systems and makes installation and retrofit much easier and faster.

Without the addition of the SPU, the expandability of the current CEN system into the sensor space is very limited. There just is not enough computational resources available to fully realize the sensor design space contained in the Aviation Internet of Things (AIoT) realm. The addition of the SPU is applicable to all current and future airplane models and will also be applicable to other vehicle types (buses, trains, etc.). The airplane cabin smart AIoT sensors and systems described herein addresses the network server loading issue associated with adding multiple sensors and sensor networks and systems onto an airplane network already burdened with video surveillance system functions.

Aviation IoT sensors can be broadly categorized into the following categories: environmental sensors, light sensors, light sensor/cameras, and electrical sensors. Environmental sensors can include, but are not limited to the following: ultrasonic sensor, light incident direction and range (LIDAR) sensor, audio sensor (microphone), temperature sensor, humidity sensor, vibration (accelerometer) sensor, magnetic (Hall Effect) sensor, air pressure sensor, airflow sensor, multi-sensor module, $CO_2$ sensor, oxygen sensor, methane sensor, ammonia sensor, olfactory sensor, shock/crash sensor, force/load/torque/strain sensor, position sensor, motion/velocity sensor, radio frequency sensor, smoke sensor, and crack wire sensor. Light sensors can include, but are not limited to the following: visible light sensor, ultraviolet sensor, infrared sensor, laser light sensor, and multi-spectrum light module (visible light, infrared, and ultraviolet). Light sensor/cameras can include, but are not limited to the following: visible light only camera, visible and infrared light camera, and forward looking infrared (FLIR) camera. Electrical sensors can include, but are not limited to the following: discrete input sensor/discrete output sensor, analog input sensor/analog output sensor, voltage sensor, current sensor, power force control (PfC) sensor, and frequency sensor.

The above-listed sensors are just a sample of the sensors available for an AIoT sensor application. Each sensor has its own unique interface and characteristics. These sensors must be translated, consolidated, digitized, and the data made available to the application running on the network server. The sensor application software running on the network server must either process the raw data or send it somewhere to be processed.

Figure 1A:
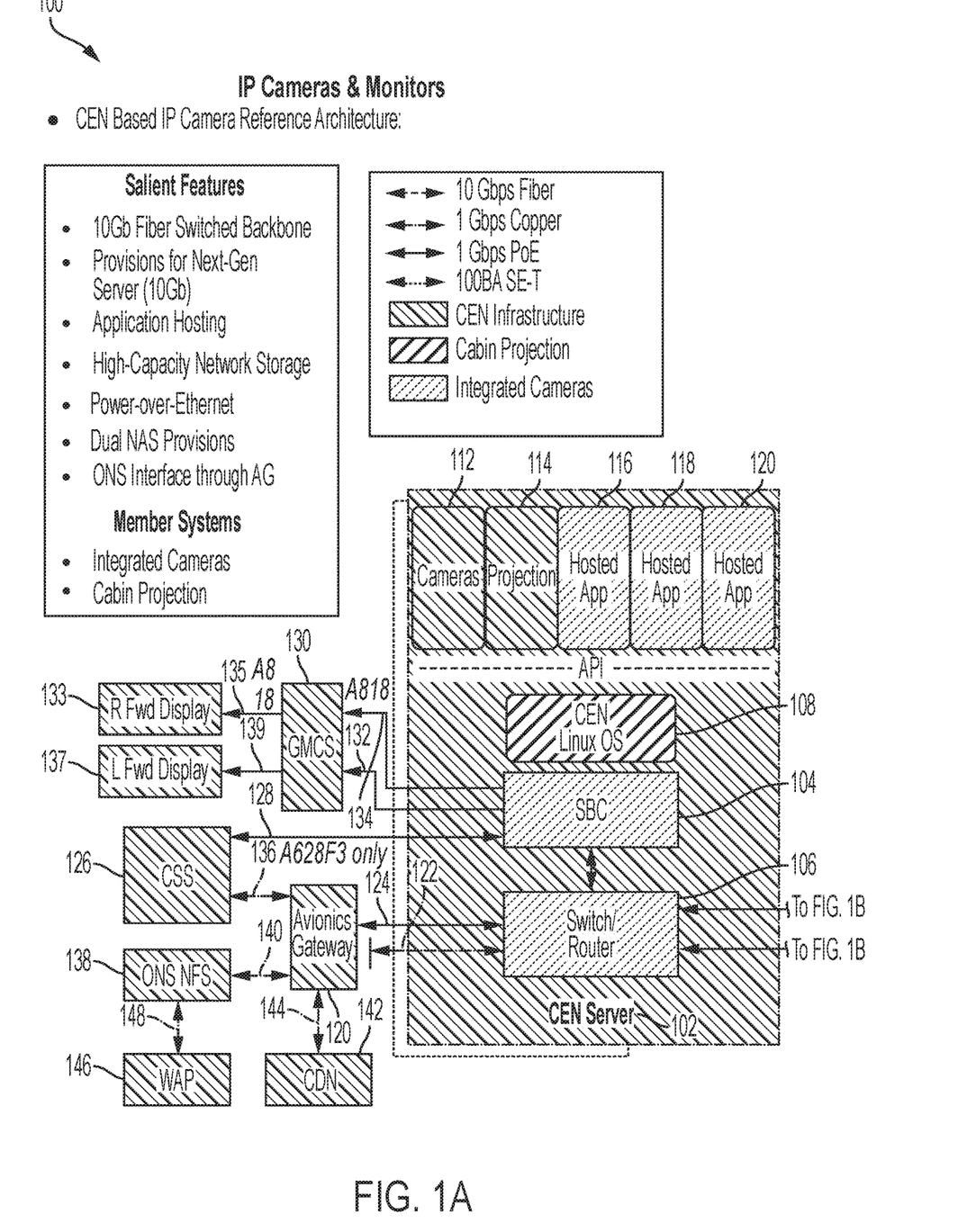
FIGS. 1A and 1B show a conventional CEN IP Camera Reference Architecture in use on commercial airplanes.
Figure 1B:
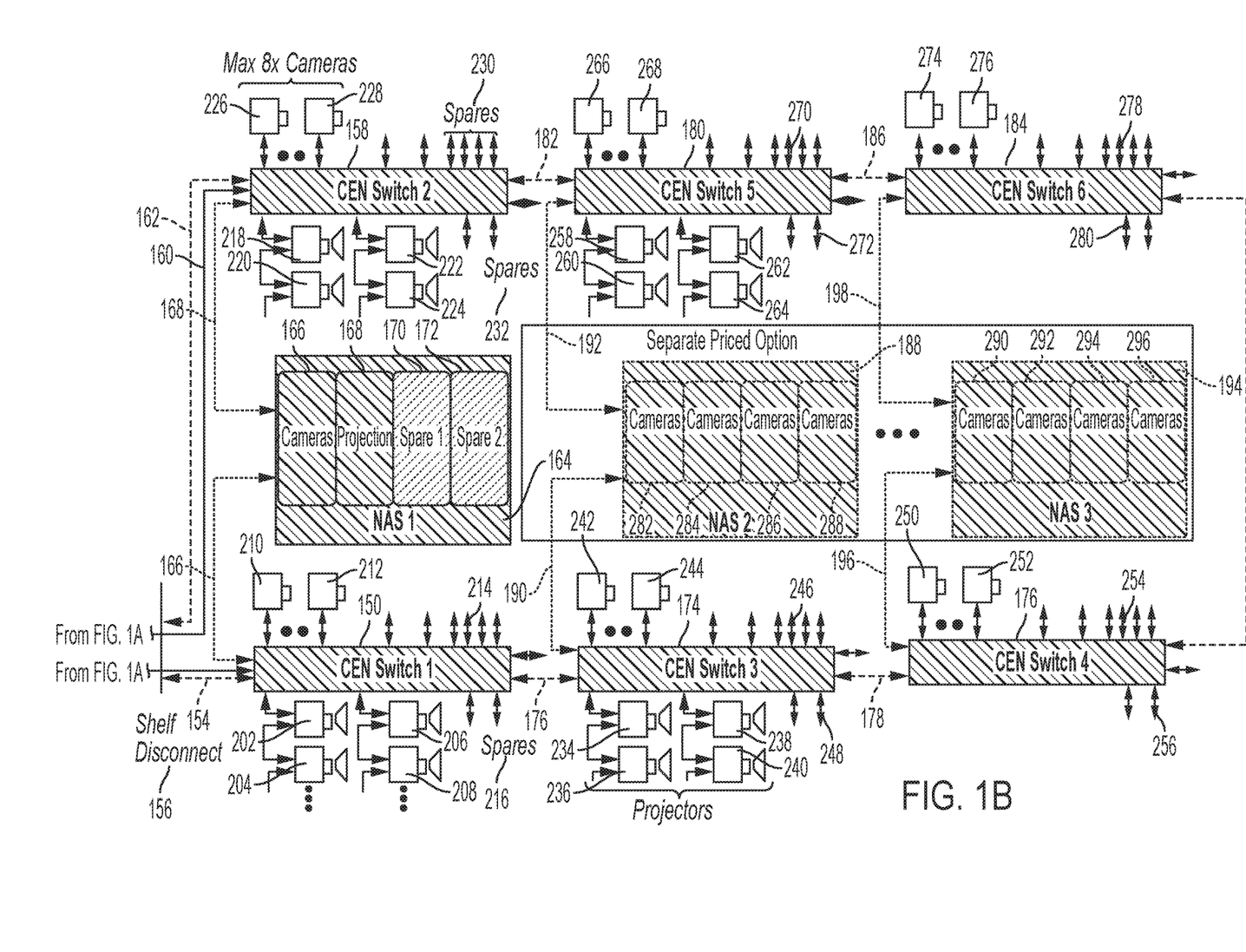

FIGS. 1A and 1B show a conventional CEN-based IP camera reference architecture 100. In FIGS. 1A and 1B, all Internet Protocol (IP) cameras, sensors, storage devices, projectors, and other additional Ethernet-based components are connected onto a CEN network via connection to a network switch. Architecture 100 includes CEN server 102. CEN server 102 includes single board computer (SBC) 104 in electrical and data communication with switch/router 106. CEN server 102 includes CEN Linux OS 108 and APIs 110, including, for example, APIs for camera 112, projection 114, hosted application 1 116, hosting application 2 118, and hosting application 3 120.

Switch/Router 106 of CEN server 102 is in electrical and data communication with avionics gateway 120 over first connector 122, for example, a 1 Gbps copper connection, and second connector 124, for example a 100BASE-T.

SBC 104 of CEN server 102 is in electrical and data communication with cabin services system (CSS) 126 over third connector 128, for example, a 100BASE-T. SBC 104 is also in electrical and data communication with ground maneuver camera system (GMCS) 130 over fourth connector 132 and fifth connector 134, for example, to provide the ARINC-818 transcoded video information needed to present the Video Surveillance System control menu and camera videos to the right and left forward flight deck screen displays. CSS 126 is a scalable, database driven, Ethernet-based network that provides core cabin functions such as passenger address, cabin interphone, and environmental controls. CSS 126 directly integrates with external subsystems such as cabin lighting and other airplane member systems across the airframe networks, including the inflight entertainment and connectivity solutions.

GMCS 130 is in electrical and data communication with right forward display 133 over sixth connector 135 and in electrical and data communication with left forward display 137 over seventh connector 139. These connections provide ARINC-818 formatted data to the forward screens from any of the systems connected to it (i.e. Ground Maneuvering cameras, Video Surveillance System control screens, or other ARINC-818 formatted inputs.).

Avionics gateway 120 is in electrical and data communication with CSS 126 over eighth connector 136, for example, a 1 Gbps copper connection, in electrical and data communication with onboard network system (ONS) network file server (NFS) 138 over ninth connector 140, for example, a 1 Gbps copper connection, and in electrical and data communication with core data network (CDN) 142 over tenth connector 144, for example, a 1 Gbps copper connection. Onboard Network System (ONS) NFS 138 is in electrical and data communication with WAP 146 over eleventh connector 148, for example, a 1 Gbps copper connection. ONS NFS 138 functions as a stand-alone server to provide a common, compact, non-essential, high-performance onboard network solution that facilitates data transfer between avionics systems and IP-based equipment.

Switch/Router 106 of CEN server 102 is in electrical and data communication with CEN Switch 1 150 over twelfth connector 152, for example, a 1 Gbps copper connection, and over thirteenth connector 154, for example 10 Gbps fiber. Thirteenth connector 154 terminates at shelf disconnect 156 that is coupled to CEN server 102. Similarly, Switch/Router 106 is in electrical and data communication with CEN Switch 2 158 over fourteenth connector 160, for example, a 1 Gbps copper connection, and over fifteenth connector 162, for example 10 Gbps fiber. Fifteen connector 162 terminates at shelf disconnect 156.

CEN Switch 1 150 and CEN Switch 2 158 are in electrical and data communication with optional NAS 1 164 over sixteenth connector 166 and seventeenth connector 168, respectively, which can be a 10 Gbps fiber. Optional NAS 1 164 provides additional storage capability to the CEN for use by the video surveillance system function.

CEN Switch 1 150 is in electrical and data communication with CEN Switch 3 174 over eighteenth connector 176, for example a 10 Gbps fiber. CEN Switch 3 174 is in electrical and data communication with CEN Switch 4 176 over nineteenth connector 178, for example a 10 Gbps fiber. Similarly, CEN Switch 2 158 is in electrical and data communication with CEN Switch 5 180 over twentieth connector 182, for example a 10 Gbps fiber. CEN Switch 5 180 is in electrical and data communication with CEN Switch 6 184 over twenty-first connector 186, for example a 10 Gbps fiber.

Optional NAS 2 188 is in electrical and data communication with CEN Switch 3 174 and CEN Switch 5 180 over twenty-second connector 190 and twenty-third connector 192, respectively, using for example, a 10 Gbps fiber. Optional NAS 2 188 provides additional storage for the video surveillance and other CEN application functions such as sensor data, etc.

CEN Switch 1 150 is shown in electrical and data communication with first projector 202, second projector 204, third projector 206, and fourth projector 208. CEN Switch 1 150 is also shown in electrical and data communication with first camera 210 and second camera 212. CEN Switch 1 150 can also include the ability of handling additional capacity, as shown by first set of spare cameras 214 and first set of spare projectors 216.

CEN Switch 2 158 is shown in electrical and data communication with fifth projector 218, sixth projector 220, seventh projector 222, and eighth projector 224. CEN Switch 2 158 is also shown in electrical and data communication with third camera 226 and fourth camera 228. CEN Switch 2 158 can also include the ability of handling additional capacity, as shown by second set of spare cameras 230 and second set of spare projectors 232.

CEN Switch 3 174 is shown in electrical and data communication with ninth projector 234, tenth projector 236, eleventh projector 238, and twelfth projector 240. CEN Switch 3 174 is also shown in electrical and data communication with fifth camera 242 and sixth camera 244. CEN Switch 3 174 can also include the ability of handling additional capacity, as shown by third set of spare cameras 246 and third set of spare projectors 248.

CEN Switch 4 176 is shown in electrical and data communication with seventh camera 250 and eighth camera 252. CEN Switch 4 176 can also include the ability of handling additional capacity, as shown by fourth set of spare cameras 254 and fourth set of spare projectors 256.

CEN Switch 5 180 is shown in electrical and data communication with thirteenth projector 258, fourteenth projector 260, fifteenth projector 262, and sixteenth projector 264. CEN Switch 5 180 is also shown in electrical and data communication with ninth camera 266 and tenth camera 268. CEN Switch 5 180 can also include the ability of handling additional capacity, as shown by fifth set of spare cameras 270 and fifth set of spare projectors 272.

CEN Switch 6 184 is shown in electrical and data communication with eleventh camera 274 and twelfth camera 276. CEN Switch 6 184 can also include the ability of handling additional capacity, as shown by sixth set of spare cameras 278 and sixth set of spare projectors 280.

Optional NAS 3 194 is in electrical and data communication with CEN Switch 4 176 and CEN Switch 6 184 over twenty-fourth connector 196 and twenty-fifth connector 198, respectively, using for example, a 10 Gbps fiber. Optional NAS 3 194 provides additional storage for the video surveillance and other CEN application functions such as sensor data, etc.

Figure 2A:
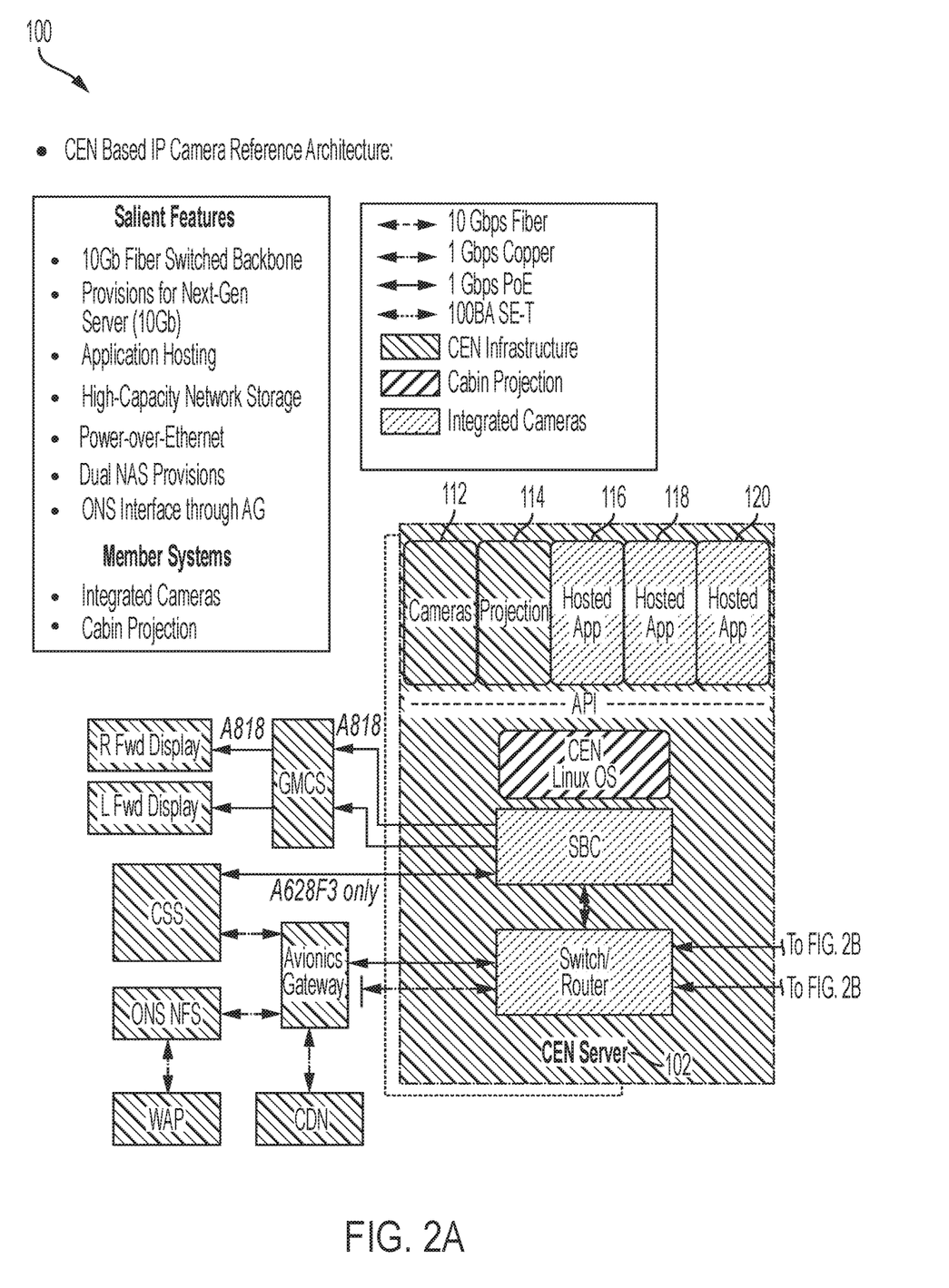
FIGS. 2A and 2B show a CEN system augmented by a network attached SPU according to examples of the present disclosure.
Figure 2B:
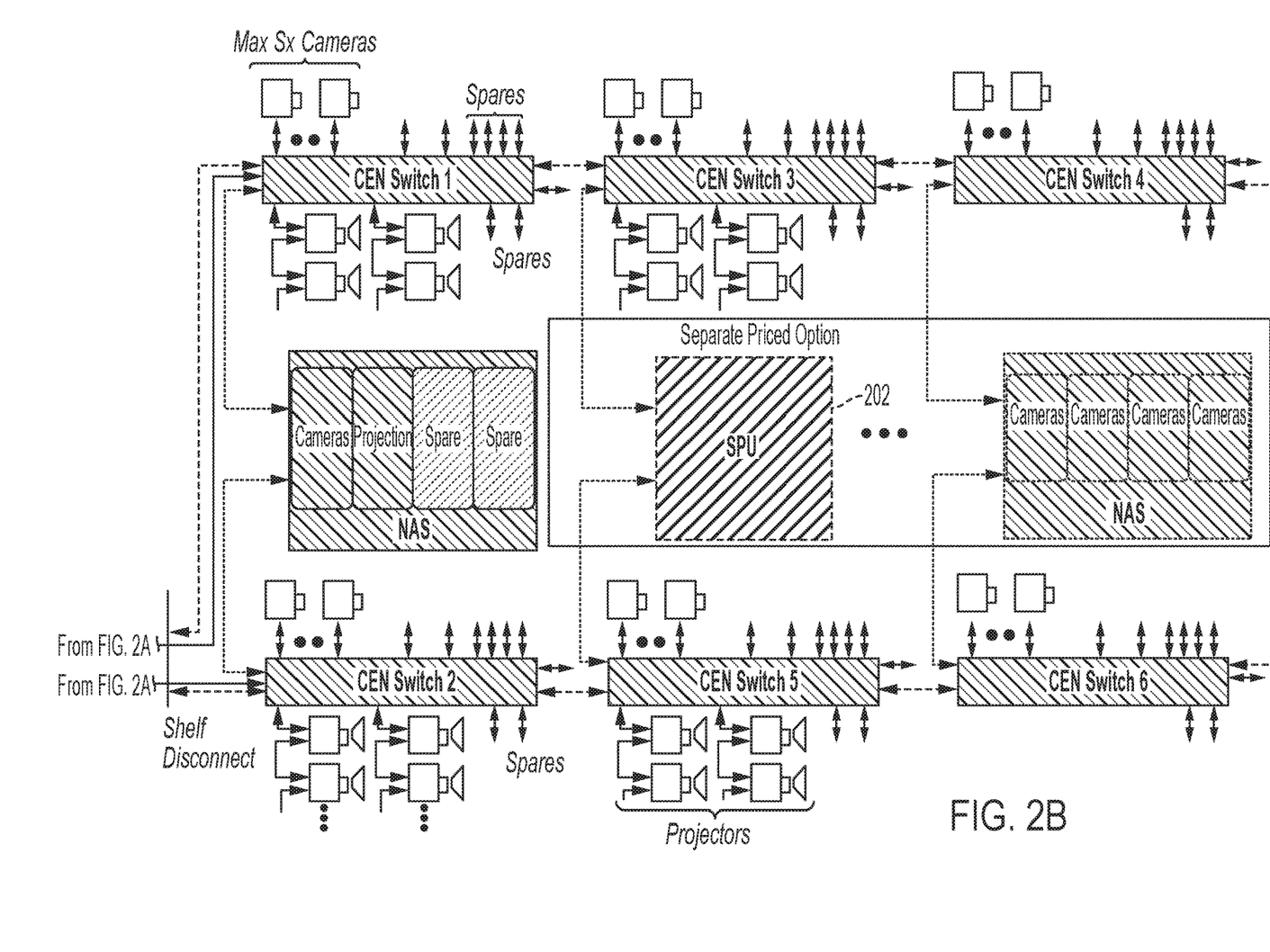

FIGS. 2A and 2B show a CEN-based IP camera with a SPU architecture 200, according to examples of the present disclosure. Architecture 200 includes the like numbered elements as described in relation to FIGS. 1A and 1B. FIGS. 2A and 2B differs from FIGS. 1A and 1B with the addition of SPU 202 in replacement of NAS 2 188. In FIGS. 2A and 2B, all IP cameras, sensors, storage devices, projectors, and other additional Ethernet-based devices are connected onto a CEN network via connection a network switch. SPU 202 connects to network switch using the same interfaces as the NAS of FIGS. 1A and 1B. SPU 202 is configured to offload operations normally performed by CEN server 102, such as computationally intensive applications including locally processing sensor data in real-time. Sensor applications, or other applications, reside on CEN server 102 network server and direct raw sensor data from one or more attached sensors to SPU 202. SPU 202 is configured to perform one or more operations including: analyzing, parsing, fusing, formatting, and/or presenting data back to a sensor application on CEN server 102 where it is routed to displays, storage, or a ground-based receiver through an off-board system of the airplane. Because SPU 202 performs the computationally heavy processing, the CEN network does not get overburdened by processing sensor data, which allows for more applications to be run on CEN server 102.

Figure 3:
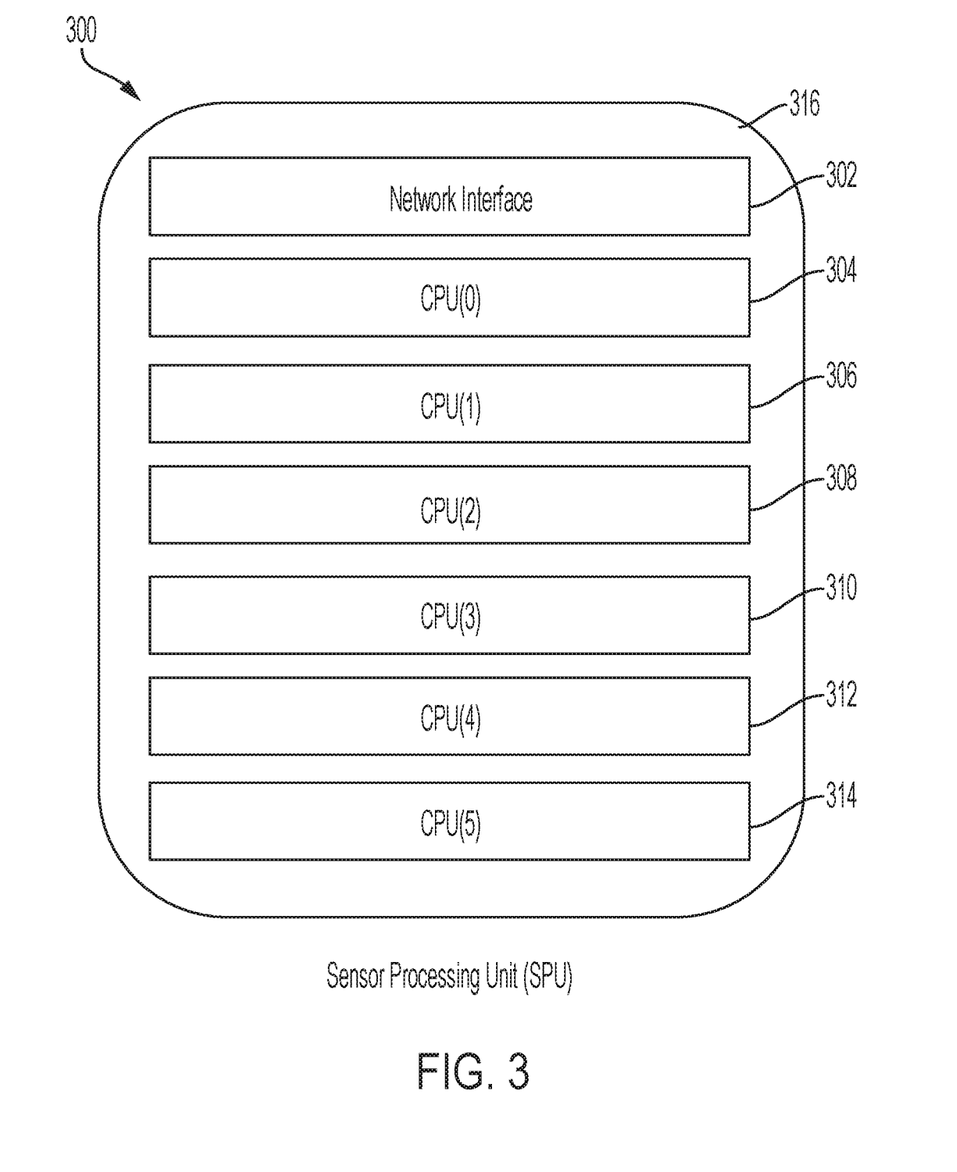
FIG. 3 shows a detailed view of SPU of FIGS. 2A and 2B.

SPU 202 is shown in greater detail in FIG. 3. SPU 202 obtains raw sensor data from CEN Switch 3 174 over twenty-second connector 190 and/or from CEN Switch 5 180 over twenty-third connector 192. SPU 202 then analyzes, parses, fuses, formats, and/or provides the sensor data back to CEN Switch 3 174 over twenty-second connector 190 and/or CEN Switch 5 180 over twenty-third connector 192. The use of the SPU 202 allows for installation and maintenance without requiring any further certification process that is typically needed with larger systems or systems that can impact security and/or flight control systems.

FIG. 3 shows a simplified block diagram of SPU 300, according to examples of the present disclosure. SPU 300 can be used as SPU 202. SPU 300 can include network interface 302, and a multi-core computer including CPU(0) 304, CPU(1) 306, CPU(2) 308, CPU(3) 310, CPU(4) 312, and CPU(5) 314 all electrically and communicatively coupled together in housing 316. Although not shown, the SPU 300 can include one or more software programs that enable the functionality described herein. The one or more software programs can include instructions that cause the multi-core computer to perform the processes, functions, and operations described herein. Copies of the one or more software programs can be stored in the one or more memory devices and/or on in the one or more storage devices. Likewise, the data utilized by one or more software programs can be stored in the one or more memory devices and/or on in the one or more storage devices.

While FIG. 3 shows six computer cores, this is merely one example implementation. More or less that six computer cores can be used depending on the processing requirements of the particular application. Each multi-core computer has a unique multi-core CPU, RAM, ROM, I/O, and storage component. All six computers are connected to a multiport network interface (network switch) inside the SPU that allows the SPSU to interface to the target network in the same tray space and interface wiring as one NAS unit. The airplane/vehicle wiring does not change, only the function of the box on the network. The SPU offloads the network server by doing the computational heavy lifting required for sensor fusion, facial recognition and multi-sensor/multi-zone/environment/motion/tracking applications, failure prediction, sensor data analysis, and data logging/post-processing.

The CEN network with SPU 202 can be useful in at least the following use examples. A first example is for facial or body recognition. In this first example, data from one or more cameras or image sensors is routed to SPU 202 where the images are compared to known or newly identified problem passengers or to search for passengers that are on a no-fly list. As the passengers enter the aircraft, they are identified by face or gait and associated with their aircraft seats. During the flight, target passengers can be monitored for movement on the aircraft.

A second example is for motion detection. In this second example, data from one or more cameras or image sensors is routed to SPU 202 where the images are monitored for movement. When detected, cabin crew can be alerted and can assist if needed.

A third example is for passenger health detection and/or prediction. In this third example, data from one or more cameras or image sensors is routed to SPU 202 where images are evaluated against signs of health issues such as fever, sweating, and/or impaired behavior to alert cabin crew before a problem develops.

A fourth example is for passenger in distress detection. In this fourth example, data from one or more cameras or image sensors is routed to SPU 202 where individual passenger motion is analyzed for signs of acute distress such as a heart attack or stroke. Cabin crew can then be notified that a problem is developing and can take action.

A fifth example is for sensor fusion. In this fifth example, data from one or more visible light cameras and/or other sensors such as a FLIR image sensor is fused in real time to provide an enhanced image for motion detection and passenger health analysis.

A sixth example is for sensor averaging. In this sixth example, data from one or more environmental sensors is routed to SPU 202 where the data is aggregated into one data set and can be iterated on throughout the flight for indications of trends for failure prediction and analysis.

A seventh example is for sensor monitoring and logging. In this seventh example, data from one or more sensors is collected and stored in a database for future analysis and use.

In the above examples, the SPU 202 can be configured using machine-learning techniques to train an algorithm, such as a neural network, to predict and detect the various sensor input. In one non-limiting example, once the algorithm is trained, the trained algorithm on the one or more of the cores of the SPU 202 can be used to detect sound from a vibration, bang, pop, or creak onboard the plane using one or more microphones and predict a likely cause of the sound spectrum that is detected. The trained algorithm can be based the prediction on a stage, i.e., taxi, takeoff, climb out, cruising, decent, landing, at which the plane is in the flight operation. The trained algorithm can determine at which location the vibration, bang, pop, or creak is detected, and the location can also be used in the prediction. If the sound spectrum is detected at a point in flight that has not been detected before, the SPU 200 can send an alert signal to one or more members of the flight crew. In one example, the one of the cores of the SPU 200 can be dedicated to running the trained algorithm to perform this detection and prediction process. This machine-learning technique can enable the SPU 200 to more efficiently process data, and thus can reduce resource consumption of the SPU 200. In some examples, an indication of the detected vibration or the detected sound is provided to the CEN server via the first CEN switch. In some examples, a location on the aircraft of the detected vibration or the detected sound is determined based on the machine-learning algorithm.

Figure 4:
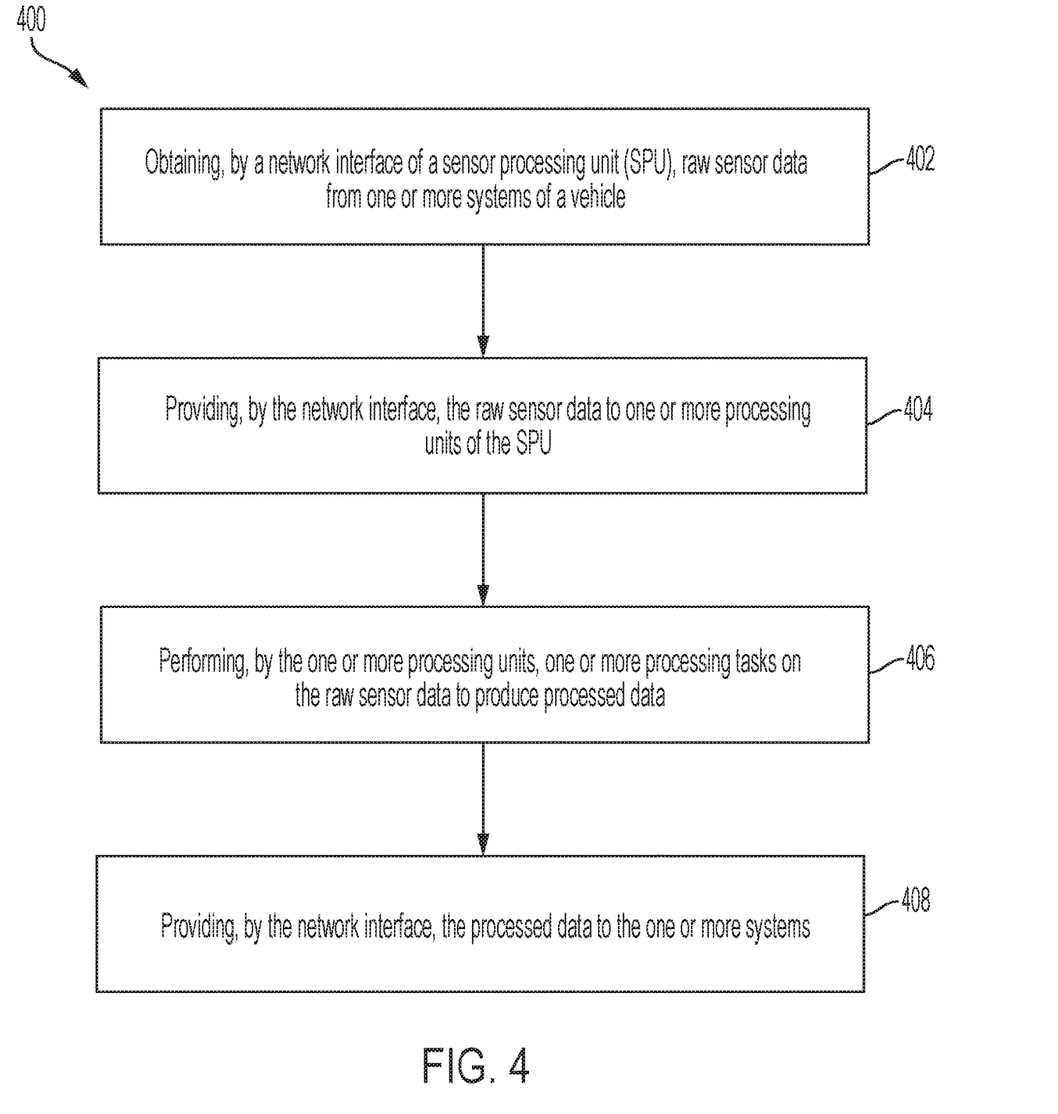
FIG. 4 shows a computer-implemented method of processing raw sensor data in an Aviation Internet of Things (AIoT) system according to examples of the present disclosure.

FIG. 4 shows a computer-implemented method of processing raw sensor data in an Aviation Internet of Things (AIoT) system according to examples of the present disclosure. The computer-implemented method 400 begins by obtaining, at 402, by a network interface of a sensor processing unit (SPU), raw sensor data from one or more systems of a vehicle. The computer-implemented method 400 continues by providing, at 404, by the network interface, the raw sensor data to one or more processing units of the SPU. The computer-implemented method 400 continues by performing, at 406, by the one or more processing units, one or more processing tasks on the raw sensor data to produce processed data. The computer-implemented method 400 continues by providing, at 408, by the network interface, the processed data to the one or more systems.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A computer-implemented method of processing raw sensor data in an Aviation Internet of Things (AIoT) system, the computer-implemented method comprising:

obtaining, by a network interface of a sensor processing unit (SPU), raw sensor data from one or more systems of a vehicle, wherein the one or more systems comprise one or more displays, one or more storage devices, one or more projector devices, and one or more off-board systems;

providing, by the network interface, the raw sensor data to one or more processing units of the SPU;

performing, by the one or more processing units, one or more processing tasks on the raw sensor data to produce processed data, wherein a first processing task of the one or more processing tasks comprises detecting a vibration or a sound onboard the vehicle; classifying a detected vibration or a detected sound; and identifying a location onboard the vehicle where the vibration or the sound originated based on the detecting and classifying;

providing, by the network interface, the processed data to the one or more systems; and providing, by the network interface, an alert to a member of a flight crew, wherein the alert is based on a type and the location onboard the vehicle of the detected vibration or the detected sound.

2. The computer-implemented method of claim 1, wherein the SPU comprises six parallel multi-core computers that are dedicated to process the raw sensor data.

3. The computer-implemented method of claim 1, wherein the SPU is in data communication with a switch of a Cabin Experience Network (CEN) system.

4. The computer-implemented method of claim 2, wherein one of the six parallel multi-core computer is trained using a machine-learning algorithm.

5. The computer-implemented method of claim 4, wherein the machine-learning algorithm is a trained neural network.

6. A computer system comprising:

at least one hardware processor;

a non-transitory computer readable medium storing instructions, that when executed by the at least one hardware processor, performs a method of processing raw sensor data in an Aviation Internet of Things (AIoT) system, the method comprising:

obtaining, by a network interface of a sensor processing unit (SPU), raw sensor data from one or more systems of a vehicle, wherein the one or more systems comprise one or more displays, one or more storage devices, one or more projector devices, and one or more off-board systems;

providing, by the network interface, the raw sensor data to one or more processing units of the SPU;

performing, by the one or more processing units, one or more processing tasks on the raw sensor data to produce processed data, wherein a first processing task of the one or more processing tasks comprises detecting a vibration or a sound onboard the vehicle; classifying a detected vibration or a detected sound; and identifying a location onboard the vehicle where the vibration or the sound originated based on the detecting and classifying;

providing, by the network interface, the processed data to the one or more systems; and providing, by the network interface, an alert to a member of a flight crew, wherein the alert is based on a type and the location onboard the vehicle of the detected vibration or the detected sound.

7. The computer system of claim 6, wherein the SPU comprises six parallel multi-core computers that are dedicated to processor the raw sensor data.

8. The computer system of claim 6, wherein the SPU is in data communication with a switch of a Cabin Experience Network (CEN) system.

9. The computer system of claim 7, wherein one of the six parallel multi-core computer is trained using a machine-learning algorithm.

10. The computer system of claim 9, wherein the machine-learning algorithm is a trained neural network.

11. A Cabin Experience Network (CEN) system comprising:
- a CEN server;
- a first CEN switch in communication with the CEN server, wherein the first CEN switch is in communication with at least one of: one or more first projector devices and one or more first cameras; and
- a sensor processing unit (SPU) in communication with the first CEN switch, wherein the SPU comprising:
- at least one hardware processor;
- a non-transitory computer readable medium storing instructions, that when executed by the at least one hardware processor, performs a method of processing raw sensor data in an Aviation Internet of Things (AIoT) system, the method comprising:
- obtaining, by a network interface of the SPU, raw sensor data from one or more systems of a vehicle, wherein the one or more systems comprise one or more displays, one or more storage devices, one or more projector devices, and one or more off-board systems;
- providing, by the network interface, the raw sensor data to one or more processing units of the SPU;
- performing, by the one or more processing units, one or more processing tasks on the raw sensor data to produce processed data, wherein a first processing task of the one or more processing tasks comprises detecting a vibration or a sound onboard the vehicle; classifying a detected vibration or a detected sound; and identifying a location onboard the vehicle where the vibration or the sound originated based on the detecting and classifying;
- providing, by the network interface, the processed data to the one or more systems; and
- providing, by the network interface, an alert to a member of a flight crew, wherein the alert is based on a type and the location onboard the vehicle of the detected vibration or the detected sound.

12. The CEN system of claim 11, further comprising:
- a second CEN switch in communication with the CEN server, wherein the second CEN switch is in communication with at least one of: one or more second projector devices and one or more second cameras, wherein
- the SPU is in communication with the second CEN switch, wherein the SPU obtains raw sensor data from the second CEN switch and processes the raw sensor data that is provided to the second CEN switch as processed sensor data.

13. The CEN system of claim 12, wherein the SPU comprises six parallel multi-core computers that are dedicated to process the raw sensor data.

14. The CEN system of claim 13, wherein one of the six parallel multi-core computer is trained using a machine-learning algorithm.

15. The CEN system of claim 14, wherein the machine-learning algorithm is a trained neural network.

16. The CEN system of claim 15, wherein the machine-learning algorithm is trained during one or more stages in aircraft flight operations to detect and classify the detected vibration or a detected sound.

17. The CEN system of claim 16, wherein an indication of the detected vibration or the detected sound is provided to the CEN server via the first CEN switch.

18. The CEN system of claim 16, wherein a location of the detected vibration or the detected sound is determined based on the machine-learning algorithm.

19. The computer-implemented method of claim 5, wherein the location of the detected vibration or the detected sound is determined based on the machine-learning algorithm.

20. The computer system of claim 10, wherein the location of the detected vibration or the detected sound is determined based on the machine-learning algorithm.

* * * * *